United States Patent
Kim et al.

(10) Patent No.: US 9,138,686 B2
(45) Date of Patent: Sep. 22, 2015

(54) CARBON MONOXIDE-SELECTIVE OXIDATION CATALYSTS

(75) Inventors: Chang H Kim, Rochester, MI (US); Gongshin Qi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 600 days.

(21) Appl. No.: 13/435,265

(22) Filed: Mar. 30, 2012

(65) Prior Publication Data

US 2013/0259779 A1   Oct. 3, 2013

(51) Int. Cl.
| | |
|---|---|
| *B01D 53/94* | (2006.01) |
| *B01J 23/83* | (2006.01) |
| *B01J 37/03* | (2006.01) |
| *B01J 23/00* | (2006.01) |

(Continued)

(52) U.S. Cl.
CPC .......... *B01D 53/9477* (2013.01); *B01D 53/944* (2013.01); *B01J 23/002* (2013.01); *B01J 23/83* (2013.01); *B01J 35/04* (2013.01); *B01J 37/031* (2013.01); *B01D 53/9418* (2013.01); *B01D 2251/2062* (2013.01); *B01D 2255/2065* (2013.01); *B01D 2255/20715* (2013.01); *B01D 2255/20761* (2013.01); *B01D 2255/40* (2013.01); *B01D 2257/502* (2013.01); *B01D 2258/012* (2013.01); *B01D 2258/0283* (2013.01); *B01J 2523/00* (2013.01); *B01J 2523/27* (2013.01); *F01N 3/2066* (2013.01); *Y02T 10/24* (2013.01)

(58) Field of Classification Search
None
See application file for complete search history.

(56) References Cited

U.S. PATENT DOCUMENTS

| 8,057,767 B1 | 11/2011 | Qi et al. |
| 2002/0114746 A1 | 8/2002 | Roark et al. |

(Continued)

FOREIGN PATENT DOCUMENTS

| DE | 10300298 A1 | 7/2004 |
| JP | 20051128 | * 5/2007 |

OTHER PUBLICATIONS

Gonzalo, Aguila, et al "CuO and CeO2 catalysts supported on Al2O3, ZrO2, and SiO2 in the oxidation of CO at low temperature". Universidad de Chile (2008).*

(Continued)

*Primary Examiner* — Melvin C Mayes
*Assistant Examiner* — Sheng H Davis
(74) *Attorney, Agent, or Firm* — Reising Ethington P.C.

(57) ABSTRACT

Particles of mixed oxides of cerium, zirconium, and copper ($CeZrCuO_X$) may be prepared as catalysts and used to preferentially catalyze the oxidation of CO in exhaust streams containing CO and $NH_3$. In one practice, this $CeZrCuO_X$ catalyst may be used in combination with a close-coupled PGM catalyst which promotes the formation of $NH_3$ in the exhaust during fuel-rich operation, and at least one underfloor $NH_3$-SCR catalyst, which catalyzes the reduction of $NO_X$ in the exhaust stream during fuel-lean operation using $NH_3$ as a reductant. During fuel-rich engine operation, the exhaust stream may be doped with oxygen downstream of the PGM catalyst and passed in contact with particles of the $CeZrCuO_X$ catalyst so that residual CO in the exhaust may be oxidized to $CO_2$, without oxidation or other conversion of the $NH_3$.

12 Claims, 3 Drawing Sheets

(51) Int. Cl.
*B01J 35/04* (2006.01)
*F01N 3/20* (2006.01)

(56) References Cited

U.S. PATENT DOCUMENTS

| | | | |
|---|---|---|---|
| 2004/0076565 A1* | 4/2004 | Gandhi et al. | 423/235 |
| 2008/0155972 A1* | 7/2008 | Driscoll et al. | 60/299 |
| 2009/0282809 A1* | 11/2009 | Toshioka | 60/285 |
| 2010/0043402 A1 | 2/2010 | Perry et al. | |
| 2010/0107605 A1 | 5/2010 | Brinkman et al. | |
| 2010/0107606 A1 | 5/2010 | Narayanaswamy et al. | |
| 2010/0257844 A1* | 10/2010 | Shimomura et al. | 60/277 |
| 2011/0131949 A1* | 6/2011 | Adams et al. | 60/274 |
| 2011/0230337 A1 | 9/2011 | Ji et al. | |

OTHER PUBLICATIONS

Cao Tian-Jun et al.; Removal of carbon monoxide from hydrogen-rich gas by catalytic oxidation over Cu—Ce—Zr—O catalysts in micro-channel reactor; Natural Gas Chemical Engineering, pp. 41-43, vol. 34, 2009.

Wei Li et al; Passive Ammonia SCR System for Lean-burn SIDI Engines; SAE International; 2010-01-0366, Published Apr. 12, 2010; SAE Int. J. Fuels Lubr./vol. 3/Issue 1; pp. 99-106.

* cited by examiner

US 9,138,686 B2

CARBON MONOXIDE-SELECTIVE OXIDATION CATALYSTS

TECHNICAL FIELD

This disclosure is related to catalyst materials for the selective oxidation of carbon monoxide in a flowing gas stream comprising carbon monoxide, ammonia, and oxygen. For example, such catalysts may be useful in the treatment of exhaust gas from a lean burn, gasoline-fueled engine that is operated to passively provide ammonia for the reduction of nitrogen oxides in the exhaust.

BACKGROUND

Gasoline engines on automotive vehicles have been controlled to operate close to a stoichiometric air-to-fuel ratio (AFR) so that carbon monoxide (CO), unburned or partially burned hydrocarbons (HC), and nitrogen oxides ($NO_X$) in the exhaust stream can simultaneously be converted to carbon dioxide ($CO_2$), nitrogen ($N_2$), and water when passed in contact with a suitable platinum group metal (PGM) catalyst. In this mode of engine operation, the catalyst is characterized as a three-way-catalyst (TWC). With an ever increasing need for higher fuel economy there is current interest in operating gasoline engines, such as spark-ignition direct-injection (SIDI) engines, at AFR values that are relatively lean of the stoichiometric ratio (i.e., fuel-lean). The direct injection of gasoline into each engine cylinder allows a combustible air-fuel mixture to be formed near the spark plug for initiating combustion with leaner mixtures elsewhere in the combustion chamber. In some limited periods of engine operation, the AFR may be slightly rich of the stoichiometric ratio, but for most periods of engine operation the engine is operated fuel-lean to maximize fuel efficiency.

In comparison to stoichiometric AFR engine operation, fuel-lean engine operation reduces the amount of CO and HC in the exhaust, but increases the amount of $NO_X$, which must be removed. The exhaust from such lean burn engines is still passed through a PGM catalyst-containing flow-through reactor to oxidize much of the CO and HC to $CO_2$ and water. But then a reductant material is added to the exhaust stream that is reactive with $NO_X$ to convert it to $N_2$ and water. The reductant material-containing exhaust is further passed through a reduction catalyst-containing flow-through reactor to promote the reduction of $NO_X$ to $N_2$ and water. Since the added reductant material and the reduction catalyst must work together in treatment of the exhaust, this practice is called a selective catalytic reduction (SCR) with respect to the removal of $NO_X$.

In a known SCR practice (especially for diesel engines), it is common to store an aqueous solution of urea on the vehicle and to inject a controlled amount of urea solution, as needed, into the exhaust stream. The urea quickly decomposes into ammonia (and carbon dioxide), and the ammonia serves as the reductant material for the $NO_X$ reduction reaction. The flowing stream is then passed over a suitable reduction catalyst, such as a particulate copper-exchanged zeolite and/or an iron exchanged zeolite material. This method of $NO_X$ reduction is commonly referred to as an $NH_3$-selective catalytic reduction (SCR) of $NO_X$.

The on-vehicle storage of a reductant material, such as urea, and its managed injection into the flowing exhaust from the engine permits flexibility in the management of lean-burn engine operation. The $NO_X$ content of the exhaust may be measured with a $NO_X$ sensor, and the addition of the reductant material may be computer-controlled in response to the output of the $NO_X$ sensor. But the vehicle operator must continually replenish the supply of urea solution, and must also keep the solution from freezing. Ammonia is a suitable reductant for $NO_X$ in a vehicle exhaust stream, but there would be a benefit if the reductant or its precursor did not have to be separately stored on the vehicle.

U.S. Patent Application Publication No. 2010/0107605 (the "'605 application"), titled "Passive Ammonia-Selective Catalytic Reduction for $NO_X$ Control in Internal Combustion Engines," is assigned to the assignee of this invention and discloses a method of passively generating $NH_3$ in an exhaust stream of a multi-cylinder, spark ignition, direct fuel injection, four stroke, gasoline engine that is primarily operated in a fuel-lean mode. But there are periods during which the "lean-burn" engine operates close to a stoichiometric AFR, or slightly fuel-rich of the stoichiometric ratio. Such periods may include, for example, engine-idle modes and vehicle acceleration modes of operation. The inventors in the '605 application recognized that oxygen-depleted engine exhaust contained $NO_X$, CO, and hydrogen in sufficient quantities and proportions to form ammonia as the exhaust flowed through the PGM flow-through reactor close-coupled to the exhaust manifold of the engine. The inventors further recognized and disclosed practices for utilization of this passively-generated ammonia to reduce $NO_X$ in a $NH_3$-SCR catalyst-containing flow-through reactor located downstream of the PGM reactor in the flow of the exhaust. The inventors recognized that, rather than adding urea solution to the exhaust, the passively-generated ammonia may eliminate the need for urea storage and injection.

The downstream $NH_3$-SCR catalyst serves to temporarily store the passively-generated $NH_3$ during fuel-rich operation. During subsequent periods of fuel-lean engine operation, the $NH_3$-SCR catalyst effectively converts $NO_X$ in the exhaust stream to $N_2$ and water using the stored $NH_3$. But, this passive $NH_3$ generation method requires the engine's modes of operation to be efficiently managed to provide enough $NH_3$ to the $NH_3$-SCR catalyst during fuel-rich operation so that a suitable supply of $NH_3$ is available on the $NH_3$-SCR catalyst during fuel-lean operation to remove $NO_X$ from the exhaust.

It is recognized that $NH_3$ generation on a PGM catalyst is enhanced when the AFR of the engine's combustible mixture is about 14 to 14.2 during fuel-rich operation. However, when the engine is operating in this fuel-rich range, the PGM catalyst may not then serve to effectively oxidize the CO in the exhaust due to the temporarily diminished supply of oxygen. And the CO is not likely to be oxidized in the $NH_3$ selective reduction reactor either.

One method of removing CO from the exhaust stream resulting from these fuel-rich periods includes passing the exhaust stream in contact with a second oxidation catalyst and with an auxiliary air injection, downstream of the PGM catalyst to promote the oxidation of residual CO in the exhaust to $CO_2$ and water. However, this oxidation catalyst must be able to oxidize the residual CO without also oxidizing the $NH_3$ which is to be used by the downstream reduction catalyst-containing flow-through reactor.

SUMMARY OF THE DISCLOSURE

This disclosure describes an oxidation catalyst that can be used to preferentially catalyze the oxidation of CO in a gas stream comprising at least carbon monoxide, ammonia, and oxygen. As will be described further, the oxidation catalyst is usually used in the form of small particles of mixed oxides of cerium, zirconium, and copper ($CeZrCuO_X$) coated on wall surfaces of a flow-through reactor. When the temperature of the gas stream is in a suitable range, the catalyst effectively oxidizes carbon monoxide to carbon dioxide with minimal effect on the ammonia content of the gas stream. While the disclosed catalyst is useful generally for selective treatment of a stream of CO and ammonia, it is particularly useful for selective oxidation of CO when ammonia is generated in a CO-containing fuel-rich engine exhaust then flowing over a PGM catalyst. In this important embodiment of the invention, carbon monoxide is converted to carbon dioxide, but the ammonia content of the exhaust stream is preserved for use in an $NH_3$-SCR reactor for $NO_X$. Accordingly, this oxidation catalyst may be referred to herein as a CO-selective oxidation catalyst.

In one embodiment, this CO-selective oxidation catalyst may be used in an exhaust treatment system for a lean-burn engine along with: (1) a PGM catalyst, preferably close-coupled to the exhaust manifold, and (2) at least one zeolite-based $NH_3$-SCR catalyst, which is positioned in the exhaust flow downstream of the PGM catalyst. In this system, the CO-selective oxidation catalyst is located downstream of the PGM catalyst and upstream of at least one $NH_3$-SCR catalyst reactors. In this arrangement, the CO-selective oxidation catalyst minimizes oxidation of the $NH_3$ generated by the PGM catalyst in the exhaust stream during fuel-rich engine operation. Thus, the $NH_3$ will be available to one or more $NH_3$-SCR catalyst reactors to participate in $NO_X$ reduction reactions during fuel-lean operation.

In another embodiment, the exhaust treatment system may include an $O_2$ dosing or injection device, located upstream of the CO-selective oxidation catalyst to provide a suitable amount of oxygen in the exhaust stream for selective oxidation of CO over the mixed oxide catalyst. The $O_2$ dosing device should be placed downstream of the PGM catalyst so as not to interfere with the PGM catalyst's $NH_3$-generation performance.

In accordance with disclosed embodiments, the particulate mixed oxide $CeZrCuO_X$ catalyst may be used to effectively and selectively catalyze the oxidation of CO in $NH_3$ and $O_2$-containing exhaust streams which are at a temperature in the range of about 200-400° C. In this temperature range the mixed oxide particles have minimal tendency to oxidize ammonia.

The $CeZrCuO_X$ mixed oxide particles may be prepared for use as the CO-selective oxidation catalyst using a co-precipitation method. In some preferred embodiments, the molar ratios of Ce, Zr, and Cu in the CO-selective oxidation catalyst may be controlled to fall within the following ranges: Ce/(Ce—Zr—Cu)=0.50-0.70, Zr/(Ce—Zr—Cu)=0.10-0.20, and Cu/(Ce—Zr—Cu)=0.15-0.35, with the sum of the molar ratios of Ce, Zr, and Cu equal to 1. The value of x depends on the proportions and oxidation state of the metal elements but typically is in the range of about one to $2^+$ or three. These compositions may be formed by dissolving suitable precursor compounds of cerium, zirconium, and copper in desired molar proportions in a common solvent. Preferably the precursor compounds contain oxygen. For example, nitrates of cerium, zirconium, and copper may be dissolved in water.

In the example of an aqueous solution of the respective nitrates, a precipitating agent, such as ammonia or sodium hydroxide, may be added to increase the pH of the solution and trigger co-precipitation of Ce, Zr, and Cu mixed hydroxides. The dried precipitate may be calcined in air at a temperature of about 400° C. to 500° C. for 4 to 6 hours to dehydrate the Ce, Zr, and Cu hydroxides and form mixed oxides of the respective base metals. The term "mixed oxide" is used in this specification to mean oxides that may contain cations of more than one base metal element or that the cations may be present in more than one oxidation state.

In many embodiments of the invention the mixed oxide catalyst will be used in combination with other catalytic reactors to dynamically treat the exhaust constituents from a vehicle engine that operates primarily in a fuel-lean mode, but with intervening periods of fuel-rich mode operation. Indeed, the mixed oxide catalyst will be particularly useful when engine operation is managed to provide a passive supply of ammonia for the catalytic reduction of $NO_X$ produced in lean-burn engine operation. In general, the fuel-lean or fuel-rich engine exhaust is passed first through a PGM catalyst-containing reactor that is close-coupled to the engine exhaust manifold (for higher exhaust gas temperatures), and then through one or more downstream $NH_3$-SCR reactors. Thus, the mixed oxide catalyst of this invention will typically be used immediately after the exhaust gas has passed through the PGM reactor.

The mixture of carbon monoxide and ammonia will be formed, as described above in this specification, when exhaust constituents from a vehicle's engine fuel-rich operation is passed in contact with a PGM catalyst. The PGM catalyst may include particles of one or more platinum group metals (PGMs), such as platinum (Pt), palladium (Pd), and rhodium (Rh), supported on particles of alumina ($Al_2O_3$) and/or ceria ($CeO_2$). However, it may be preferred to use PGM materials that do not store oxygen during fuel-lean operation for oxidation during fuel-rich operation so as to minimize oxidation of ammonia. For example, the PGM catalyst may comprise $Al_2O_3$-supported particles of Pd and Rh, wherein the molar ratio of Pd to Rh is 6:1. The downstream $NH_3$-SCR catalyst may comprise particles of a copper (Cu) or iron (Fe) ion-exchanged suitable zeolite or silicoaluminophosphate composition.

Particles of the PGM catalyst, the $CeZrCuO_X$ mixed oxide catalyst, and the $NH_3$-SCR catalyst may be dispersed on one or more, high surface area, support bodies in the form of a thin washcoat layer or layers. These catalyst-bearing support bodies may be housed within flow-through reactors and positioned along the flow path of the exhaust stream from the engine. The specific location of each of these reactors in the exhaust treatment system may be dependent upon the operating temperature range of each of the catalyst materials. In general, particles of the PGM catalyst may be housed within a flow-through reactor that is close-coupled to the engine, and particles of the $NH_3$-SCR catalyst may be housed downstream in the exhaust flow path in one or more flow-through reactors that are located under the vehicle floor. The CO-selective oxidation catalyst may be positioned in the exhaust system at locations downstream of the PGM reactor and suitable for oxidizing CO and preserving ammonia for an $NH_3$-SCR reactor.

It is generally found that a vehicle engine can be managed to operate fuel rich during engine idling, vehicle acceleration, and other modes of operation even when the engine is managed to operate fuel-lean during most of its operating modes. So long as the $NH_3$-SCR catalyst particles have an adequate supply of $NH_3$, $NO_X$ may be continuously removed from the exhaust stream, even during prolonged periods of fuel-lean engine operation. To determine when such a fuel-rich period or cycle should be initiated, the exhaust system may include at least one $NO_X$ sensor located downstream of the one or more $NH_3$-SCR reactors. If a $NO_X$ sensor indicates that $NO_X$ is escaping from the one or more $NH_3$-SCR reactors, a fuel-rich engine operation cycle may be triggered to replenish $NH_3$ storages sites on the $NH_3$-SCR catalyst particles. In addition, each $NH_3$-SCR reactor may be equipped with a $NH_3$ sensor to signal when the NH₃ storages sites on the NH₃-SCR catalyst are saturated with NH₃ so that fuel-lean operation can quickly resume.

Furthermore, the passive NH₃-SCR system may replenish NH₃ storages sites on the NH₃-SCR catalyst by taking advantage of the fuel-rich periods that inevitably and repeatedly occur during normal, every-day driving conditions.

DETAILED DESCRIPTION

Figure 1:
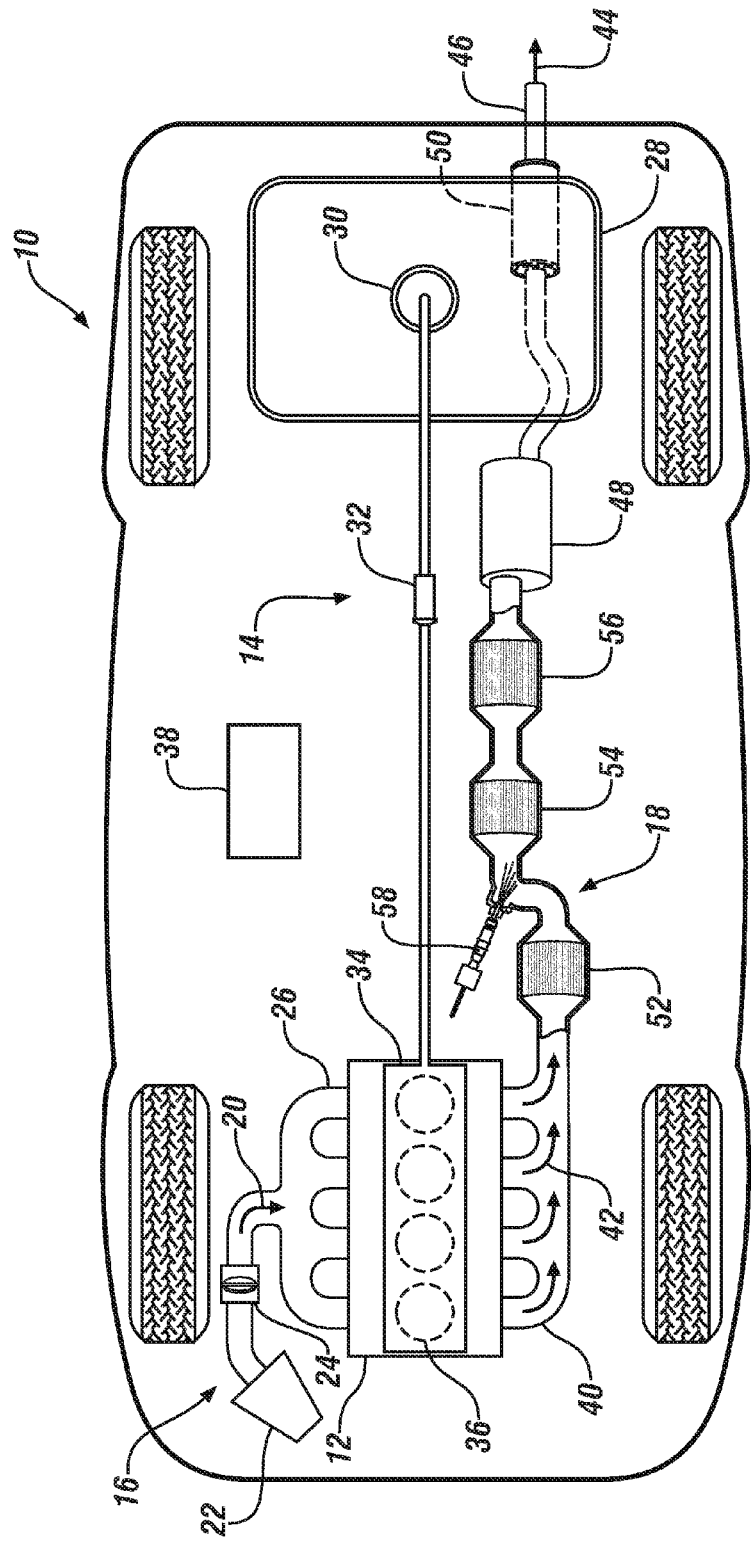
FIG. 1 is a schematic illustration of an automotive vehicle's internal combustion engine, fuel supply system, air intake system, and exhaust system. In this illustration, the exhaust system includes three serially-arranged catalyzed flow-through reactors which are formulated to cooperatively and successfully treat the exhaust stream from the engine before discharge to the atmosphere.

FIG. 1 is a schematic illustration of the engine and exhaust passage system of an automotive vehicle 10 that includes an internal combustion engine 12, a fuel supply system 14, an air intake system 16, and an exhaust system 18. In modern engines, the operation and coordination of each of these systems is electronic computer-controlled as part of an overall engine management system. The multi-cylinder, reciprocating piston, internal combustion engine 12 may be a compression ignition engine (i.e., diesel engine), a spark ignition engine (i.e., gasoline engine), or a combination. During its operation, engine 12 inducts or draws in air flow 20 by the air intake system 16, which includes an air filter 22, a throttle-body valve 24, and an intake manifold 26 coupled to the engine 12. The engine 12 is supplied with fuel by the fuel supply system 14, which includes a fuel tank 28, a fuel pump 30, and a fuel filter 32 that deliver fuel through a fuel line to the intake manifold region 34 of the engine overlying the cylinders 36 of the engine.

In FIG. 1, the intake manifold region 34 is the area of the engine in which a plurality of fuel injectors or nozzles (not illustrated) may be located. The fuel injectors or nozzles of the fuel injection system are configured and controlled to open for an amount of time to dispense or spray a desired amount of pressurized fuel near intake valve openings (not illustrated) or directly into combustion chambers of the engine's cylinders 36. Alternatively, the fuel injection system may include a single fuel injector that is located at a suitable position within the intake manifold region 34. This single injector may be controlled to dispense a predetermined amount of fuel into the incoming air flow 20 so that the desired amount of fuel is sequentially supplied to each of the cylinders 36 of the engine 12 as their respective intake valves open to receive the carefully controlled charge of air and fuel.

The management of airflow and fuel injection and amount and timing to the engine in response to driver throttle or brake actuation is provided by at least one electronic control module (ECM) 38. The ECM 38 monitors certain engine operating parameters by receiving input data through a plurality of signal leads which are attached to various sensors on the engine and the engine's related systems (not shown). The ECM 38 processes the input data and generates output data which is sent via another set of signal leads to actuators on various engine and vehicle components. In FIG. 1, no leads are shown from any engine systems to the ECM 38 and no leads are shown to any actuators on the engine or on vehicle components. However, a plurality of leads would normally be present as part of the vehicle's electronic management system.

In particular, the ECM is responsible for sending signals to actuators that operate the fuel injectors and/or the throttle-body valve 24 of the vehicle 10 so that the combustible mixture supplied to the engine exhibits the instantly-desired air-to-fuel mass ratio (AFR). In this way, the ECM is able to continuously manage the AFR of the mixture of air and fuel that is supplied to the engine 12 in accordance with an engine control strategy. The quantity of fuel injected into the cylinders or into the incoming air flow may be controlled to maintain a predetermined lean AFR or a predetermined rich AFR, or to switch between the two modes of engine operation. Or, the amount of injected fuel may be controlled so that the AFR of the combustible mixture fluctuates in a narrow range, such as above and below the stoichiometric AFR.

The combustible mixture of air and fuel is supplied to cylinders 36 (usually four to eight) of the engine 12 and the various combustion products are expelled from the cylinders 36 of the engine 12 through an exhaust manifold 40 as an effluent exhaust stream 42. The exhaust system 18 of the vehicle 10 comprises an enclosed and contained exhaust duct and exhaust treatment components that cooperate to receive the exhaust stream 42 from the engine 12 and to discharge a treated exhaust stream 44 from the tailpipe 46 to the ambient atmosphere. Treatment of the combustion products is accomplished by passing the exhaust stream 42 through various flow-through devices. For example, a typical exhaust system 18 of an automotive vehicle 10 includes a muffler 48 and a resonator 50 for reducing the amount of noise emitted by the exhaust system 18. The exhaust system 18 of most engines also includes at least one catalyzed flow-through reactor to promote (1) the oxidation of CO to $CO_2$, (2) the oxidation of HC to $CO_2$ and water, and (3) the reduction of $NO_x$ to $N_2$ and water in the effluent exhaust stream 42 from the engine 12.

The exhaust system 18 shown in FIG. 1 illustrates three serially-arranged catalyzed flow-through reactors 52, 54, 56 located within the path of the exhaust stream 42 from the engine 12. However, a variety of locations and arrangements are possible for the at least one catalyzed flow-through reactor of the exhaust system 18. For example, each of the catalyst materials of the passive $NH_3$-SCR exhaust treatment system may be located in separate flow-through reactors, or more than one of the catalyst materials may be housed within a single flow-through reactor. In addition, the flow-through reactors need not be arranged in a progressive series flow path. For example, the flow-through reactors may be arranged in parallel and a portion of the exhaust stream from the engine may be controlled to pass through one flow-through reactor, which the remaining portion of the exhaust passes through another flow-through reactor. Alternatively, the exhaust stream from the engine may be controlled to pass though some, but not all, of the flow-through reactors at a given time.

In the embodiment illustrated in FIG. 1, the PGM catalyst powder may be washcoated within a first flow-through monolith reactor 52, which is close-coupled to the exhaust manifold 40 of engine 12. The CO-selective oxidation catalyst powder may be washcoated within a second flow-through monolith reactor 54, which is positioned downstream of the first flow-through reactor 52, relative to a flow direction of the exhaust stream 42 from the engine 12. And the $NH_3$-SCR catalyst powder may be washcoated within a third flow-through monolith reactor 56, which is positioned downstream of both the first and second reactors 52, 54 in an under-floor position. In this embodiment, an oxygen dosing or injection device 58 may be located upstream of the second flow-through reactor 54, but downstream of the first flow through (PGM) reactor 52. The oxygen dosing device 58 is preferably configured to inject an amount of oxygen into the flowing exhaust stream 42 before the exhaust passes over particles of the CO-selective oxidation catalyst.

In another embodiment, particles of a first $NH_3$-SCR catalyst may be washcoated within a second flow-through monolith reactor 54, which is positioned downstream of the first flow-through monolith reactor 52 in an under-floor position. And particles of the CO-selective oxidation catalyst and additional $NH_3$-SCR catalyst may be washcoated within a third flow-through monolith reactor 56, which is positioned downstream of both the first and second monolithic reactors 52, 54 in an under-floor position. In this embodiment, the oxygen dosing device 58 may be located upstream of the third flow-through monolith reactor 56, but downstream of the first and second flow-through monolith reactors 52, 54.

In yet another embodiment, particles of a first $NH_3$-SCR catalyst may be washcoated within a second flow-through monolith reactor 54, which is positioned downstream of the first flow-through monolithic reactor 52 in an under-floor position. And particles of the CO-selective oxidation catalyst and additional $NH_3$-SCR catalyst may be washcoated within two flow-through reactors that are arranged in parallel and positioned downstream of both the first and second monolith reactors 52,54 in an under-floor position (not shown).

The operating temperature range of each of these catalysts during typical vehicle driving conditions can be controlled by adjusting the distance each catalyst-washcoated converter is located from the engine in the exhaust system. In general, the closer each catalyst-bearing support body is to the hot exhaust outlet of engine, the higher its operating temperature will be. In one embodiment, the PGM catalyst may be held within a reactor that is close-coupled to the engine so that, during normal driving conditions, the average temperature of the PGM catalyst is in the range of about 350-550° C. On the other hand, the CO-selective oxidation catalyst and the $NH_3$-SCR catalyst may be held within at least one reactor that is positioned downstream of the PGM catalyst and under the vehicle floor, so that, during normal driving conditions, the average temperature of these catalysts is in the range of about 200-400° C.

In addition, particles of any one of these catalyst materials may be housed within multiple serially-arranged reactors (with some reactors being closer to the engine that others) so that some of the catalyst particles experience a relatively high-temperature operating range and the other catalyst particles experience a relatively low-temperature operating range. In this way, the architecture of the exhaust treatment system can be configured to cover a wide range of driving conditions.

Figures 2, 2A:
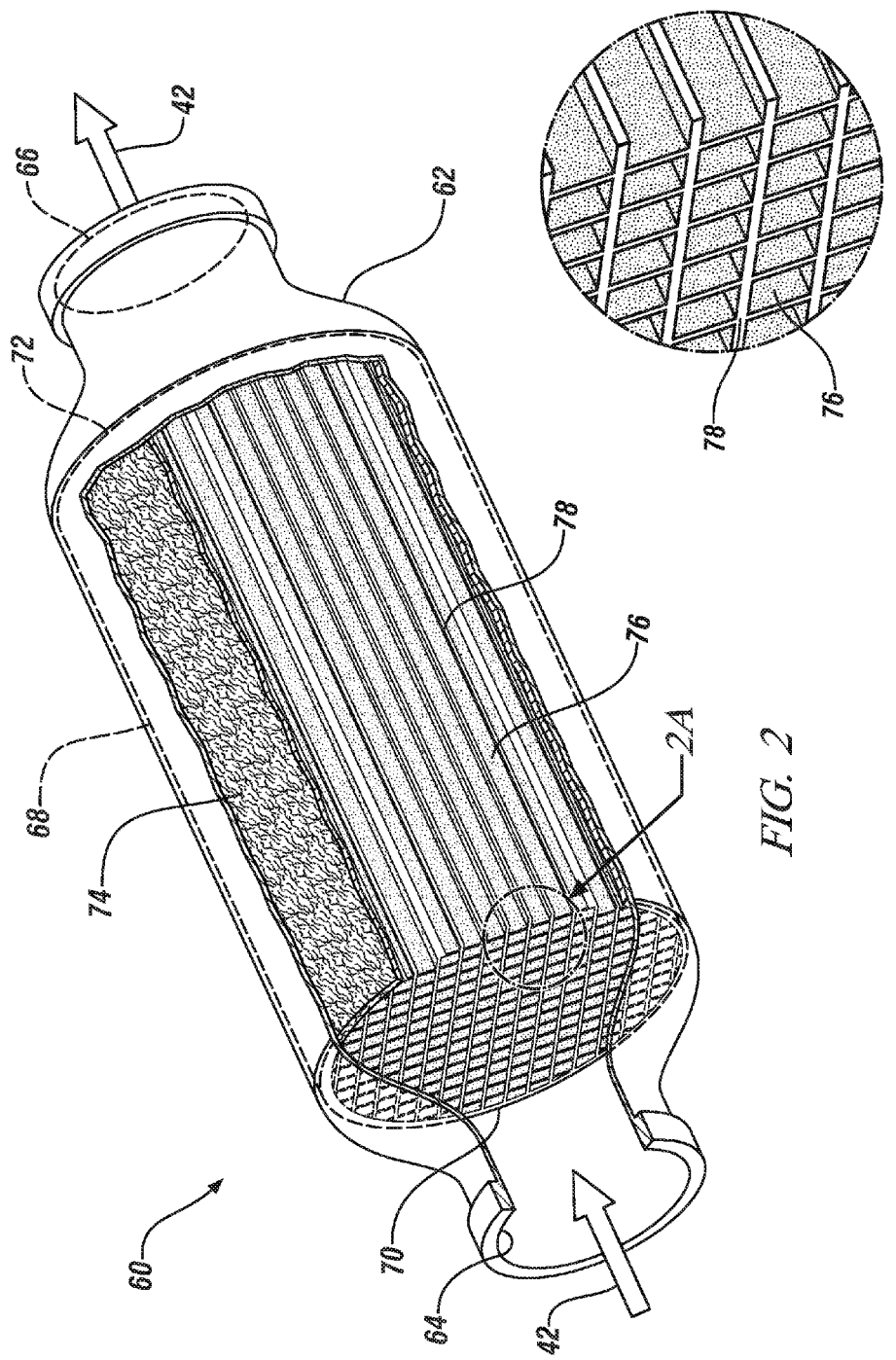
FIG. 2 is a cutaway view of one of the schematically illustrated catalyzed flow-through reactors depicted in FIG. 1. This catalyzed flow-through reactor includes a suitable high temperature capability and oxidation resistant metal container, which houses a catalyst-bearing support body that is held in place by a mounting material. In this illustration, the support body is an extruded ceramic honeycomb-shaped monolith and includes several small, square, parallel flow-through channels which are defined by walls that extend longitudinally from an inlet to an outlet face of the support body. A portion of the container, the mounting material, and the support body have been cut-way in this illustration to better reveal the internal structure of the support body.
FIG. 2A is an enlarged view of a portion of the inlet face of the extruded ceramic honeycomb-shaped support body depicted in FIG. 2, which better reveals the internal flow-through channels and walls of the support body.

By way of illustration, a suitable catalyzed flow-through reactor 60 for the passive $NH_3$-SCR exhaust treatment system is shown in FIG. 2. The catalyzed flow-through reactor 60 comprises an alloy steel container 62 shaped with an upstream opening 64 and a downstream opening 66. The upstream opening 64 is configured to receive the exhaust stream 42 and the downstream opening 66 is configured to discharge the exhaust stream 42. The body of the container 62 is often round or elliptical in cross-section and is sized to hold a catalyst-bearing support body 68. The support body has an inlet face 70 and an outlet face 72, which are transverse to the flow direction of the exhaust stream 42. The support body 68 is held in place within the container 62 by a thermally insulating and physically durable mounting material 74.

The support body 68 shown in FIG. 2 is an extruded ceramic, honeycomb-shaped monolith. However, other thermally stable materials, such as stainless steel, may be used to form other suitable high surface area support bodies. As shown in FIG. 2, the extruded ceramic support body 68 includes several small, square, parallel flow-through channels 76 that are defined by walls 78 which extend longitudinally from the inlet face 70 to the outlet face 72 of the support body 68. The inlet face 70 of the support body 68 is sized to provide a suitable number of channels 76 (preferably, at least 400 per square inch) to collectively accommodate a desired flow rate for the exhaust stream 42, and, thus, a desired residence time of the exhaust gases within the support body 68. In FIG. 2, a portion of the container 62, mounting material 74 and support body 68 have been cut-away to better reveal the many internal channel openings 76 and the channel walls 78 extending from the inlet to the outlet of the support body.

In practices of this invention, fine catalyst particles are deposited onto the walls 78 of the small flow-through channels 76 in the form of a thin washcoat layer or layers. The high total surface area of the many channel walls 78 provides sufficient contact surface area between the exhaust flow 42 and the catalyst particles for the desired oxidation, reduction and storage reactions to occur.

The exhaust flow may be exposed to other devices or mechanical equipment not expressly shown in FIG. 1 that may or may not help treat the exhaust gas constituents. These devices include, for example, a diesel particulate filter, a three-way-catalyst, a lean $NO_X$ trap, an exhaust gas recirculation line, and/or a turbocharger turbine. Skilled artisans will undoubtedly know of, and understand, these and the many other devices that the exhaust flow could be exposed to.

The above discussion with respect to FIGS. 1 and 2 describes locations for the subject selective carbon monoxide oxidation catalyst in an automotive vehicle in which the engine is being operated fuel-lean overall but with periodic fuel-rich cycles to generate sufficient ammonia for $NO_X$ reduction using an ammonia selective catalytic reduction reactor. The following disclosure pertains to the preparation of the mixed oxide catalyst and to its use in oxidation of CO in a gas stream also containing ammonia and oxygen.

EXAMPLE

In this example, particles of $CeZrCuO_X$ mixed oxides were prepared via a co-precipitation method. The CO and $NH_3$ oxidation activity of the as-prepared $CeZrCuO_X$ particles was then compared to that of a conventional Pd/Rh TWC catalyst. The Pd/Rh catalyst was obtained from BASF and had a Pd to Rh molar ratio of 6:1.

A precursor solution was prepared by dissolving metal nitrates of $(NH_4)_2Ce(NO_3)_6$, $Zr(NO_3)_4$, and $Cu(NO_3)_2$ with molar ratios of 0.6:0.15:0.25 in deionized water at room temperature. Once the metal nitrates were dissolved in solution, the precursor solution was held with stirring for about 0.5 hours.

Next, a one molar sodium hydroxide solution was added to the precursor solution with vigorous stirring until its pH value reached 10 and a suspended co-precipitate of the base metals formed. The suspension was left at room temperature for 18 hours with mild stirring. Thereafter, the suspension was heated to 80° C. for 2 hours, and the co-precipitate was filtered from the liquid phase. The filtered precipitate was washed with hot deionized water, dried overnight at 110° C., and then calcined at 400° C. for 4 hours.

The CO and $NH_3$ oxidation activity of the as-prepared $CeZrCuO_X$ mixed oxide particles and the Pd/Rh particles was measured by placing 0.1056 cc of the respective catalyst powder in separate packed bed quartz tubular reactors, each having an outer diameter of ⅜ inch. A gas stream comprising 5000 ppmv CO, 1500 ppmv $NH_3$, 5 vol. % $CO_2$, 0.5 vol. % $O_2$, 5 vol. % $H_2O$, with $N_2$ as balance was fed in separate tests to each of the oxidation catalyst-filled tubular reactors through heated stainless steel lines at an hourly gas space velocity of SV=30,000 $h^{-1}$ in each test.

The CO and $NH_3$ conversion performance of the $CeZrCuO_X$ catalyst and the Pd/Rh catalyst were separately measured, each over a temperature range of 100° to 550° C. The percent CO and $NH_3$ conversion values were calculated by comparing the concentration of CO and $NH_3$ in the gas stream at both the inlet ($[CO]_{inlet}$ or $[NH_3]_{inlet}$) and the outlet ($[CO]_{outlet}$ or $[NH_3]_{outlet}$) of each tubular reactor. Thus, the conversion (%) of CO or $NH_3$ is equal to $[CO]_{inlet}/[CO]_{outlet}$ or $[NH_3]_{inlet}/[NH_3]_{outlet}$.

Figure 3:
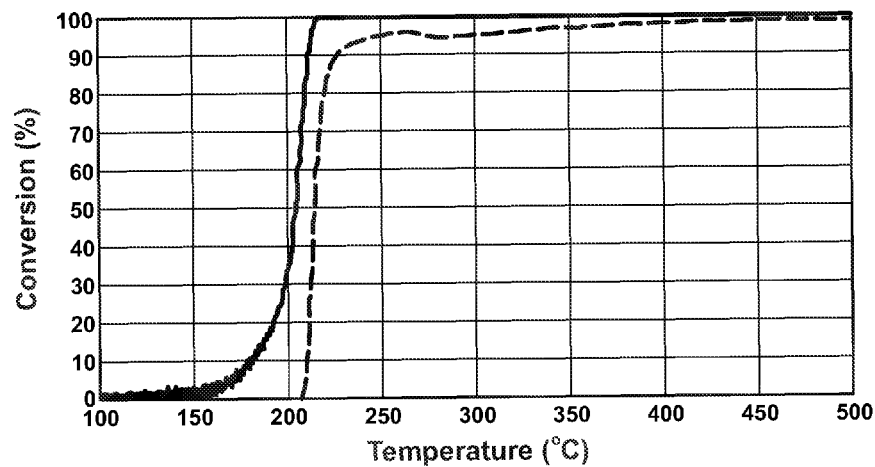
FIG. 3 is a graph of Conversion (%) vs. Temperature (° C.) showing the CO (solid line curve) and NH₃ (dashed line curve) conversion performance of a conventional Pd/Rh three-way catalyst as a function of temperature in a gas stream comprising 5000 ppmv CO, 1500 ppmv NH₃, 5 vol. % CO₂, 0.5 vol. % O₂, 5 vol. % H₂O, with N₂ as balance; SV=30,000 h⁻¹. The percent CO and NH₃ conversion values were calculated by comparing the concentration of CO and NH₃ in the gas stream at both the inlet ($[CO]_{inlet}$ or $[NH_3]_{inlet}$) and the outlet ($[CO]_{outlet}$ or $[NH_3]_{outlet}$) of a quartz tubular reactor.
Figure 4:
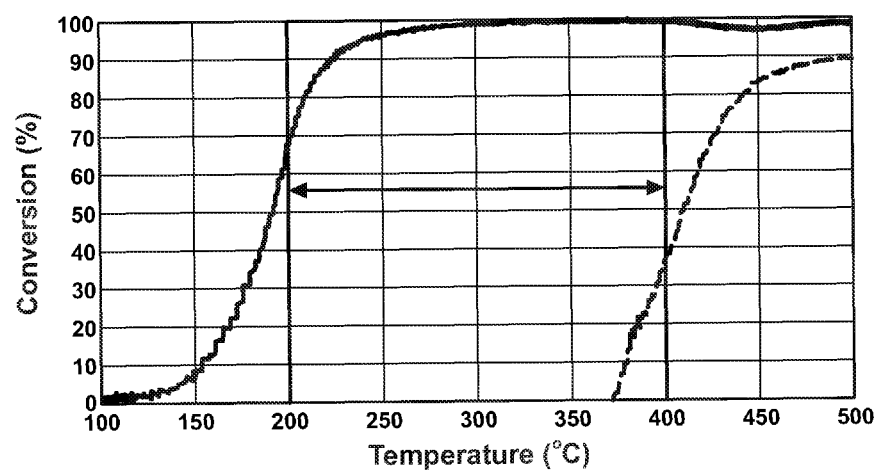
FIG. 4 is a graph of Conversion (%) vs. Temperature (° C.) showing the CO (solid line curve) and NH₃ (dashed line curve) conversion performance of a $Ce_{0.6}Zr_{0.15}Cu_{0.25}O_2$ catalyst as a function of temperature in a gas stream comprising 5000 ppmv CO, 1500 ppmv NH₃, 5 vol. % CO₂, 0.5 vol. % O₂, 5 vol. % H₂O, with N₂ as balance; SV=30,000 h⁻¹. The percent CO and NH₃ conversion values were calculated by comparing the concentration of CO and NH₃ in the gas stream at both the inlet ($[CO]_{inlet}$ or $[NH_3]_{inlet}$) and the outlet ($[CO]_{outlet}$ or $[NH_3]_{outlet}$) of a quartz tubular reactor. The region between darkened vertical lines at 200° C. and 400° C., also indicated by the horizontal line with arrow heads, represents the temperature range at which the $CeZrCuO_X$ catalyst can be effectively used to selectively oxidize CO, instead of NH₃ in exhaust streams.

The percent conversion values of CO (solid line curve) and $NH_3$ dashed line curve) versus gas stream temperature for the Pd/Rh catalyst (for a conventional three-way catalyst) is presented graphically in FIG. 3. Like data for the $CeZrCuO_X$ catalyst is presented in FIG. 4. As shown in FIGS. 3 and 4, both the Pd/Rh catalyst and the $CeZrCuO_X$ catalyst began oxidizing CO (solid line, both figures) at around 150° C. and reacted >90% CO conversion at about 225° C. The Pd/Rh catalyst began oxidizing $NH_3$ (dashed line, both figures) at around 210° C. and reached >90% $NH_3$ conversion at 225° C.

But, the $CeZrCuO_X$ catalyst did not begin oxidizing $NH_3$ until around 375° C., and did not reach >90% $NH_3$ conversion until about 475° C.

It is found that similar $CeZrCuO_X$ catalyst compositions prepared in a like manner are likewise affective for the selective oxidation carbon monoxide in gas streams also containing ammonia and oxygen over temperature ranges of about 200° C. to about 400° C. In general, it is preferred that the molar ratios of Ce, Zr, and Cu in the particles of co-precipitated mixed oxides be controlled to fall within the following ranges: $Ce_aZr_bCu_cOx$ where a has a value in the range of 0.50 to 0.70, b has a value in the range of 0.10-0.20, and c has a value in the range of 0.15-0.35, with the sum of these molar ratios of Ce, Zr, and Cu equal to 1. The value of x depends on the proportions and oxidation state of the metal elements but typically is in the range of about one to three.

Therefore, particles of $CeZrCuO_X$ mixed oxides can effectively be used to selectively oxidize CO in exhaust streams comprising carbon monoxide, ammonia, and oxygen, and having a temperature in the range of about 200° C. to 400° C., which is shown in FIG. 4 as the "CO Selective Oxidation Regime." The gas stream may contain other non-interfering constituents such as water, carbon dioxide, and nitrogen. Under these conditions much of the carbon monoxide is oxidized to carbon dioxide and much of the ammonia is unaffected.

Practices of the invention have been described using illustrative examples which are not intended to limit the scope of the claimed invention.

The invention claimed is:

1. A method of removing carbon monoxide (CO), hydrocarbons (HC), and nitrogen oxides ($N_X$) from an exhaust stream of an internal combustion engine that is powering an automotive vehicle, the engine being configured and controlled to primarily operate fuel-lean, but also to periodically operate fuel-rich to generate ammonia ($NH_3$) in the exhaust stream, the method comprising:
   controlling the engine during fuel-rich operation so that the exhaust stream from the engine contains nitrogen oxides ($N_X$), carbon monoxide (CO), and hydrogen ($H_2$), but little or no oxygen ($O_2$);
   passing the exhaust stream from the engine in contact with particles of a platinum group metal (PGM) catalyst to convert an amount of $N_X$, CO, and/or $H_2$ in the exhaust stream to ammonia ($NH_3$); and thereafter
   adding oxygen to the exhaust stream and passing the exhaust stream in contact with particles of a CO-selective oxidation catalyst to oxidize CO in the exhaust stream to carbon dioxide ($CO_2$) without oxidizing the $NH_3$, the CO-selective oxidation catalyst comprising particles of mixed oxides of cerium (Ce), zirconium (Zr), and copper (Cu), the mixed oxides of cerium, zirconium, and copper consisting of $Ce_aZr_bCu_cOx$, which is formulated such that a has a value in the range of 0.50 to 0.70, b has a value in the range of 0.10 to 0.20, and c has a value in the range of 0.15 to 0.35, with the sum of these molar ratios of Ce, Zr, and Cu being equal to 1, and the value of x is in the range of one to three.

2. The method of claim 1 in which the mixed oxides of cerium, zirconium and copper were formed by a process comprising co-precipitation of their respective compounds from a common solution and oxidation of the co-precipitate.

3. The method of claim 1 further comprising:
   passing the exhaust stream in contact with particles of an $NH_3$-SCR catalyst to remove and temporarily store the $NH_3$ on $NH_3$-storage sites on the $NH_3$-SCR catalyst.

4. The method of claim 3 further comprising:
controlling the engine during fuel-lean operation so that the exhaust stream from the engine contains $N_X$ and $O_2$;
passing the exhaust stream from the engine in contact with particles of the $NH_3$-SCR catalyst to reduce $N_X$ in the exhaust stream to $N_2$ and water using stored $NH_3$.

5. The method of claim 4 wherein the engine is controlled to operate fuel-lean by supplying the engine with a mixture of air and gasoline fuel in which the AFR of the mixture is greater than 14.7.

6. The method of claim 3 wherein the $NH_3$-SCR catalyst comprises at least one of a base metal ion-substituted zeolite and a base metal ion-substituted silicoaluminophosphate.

7. The method of claim 6 wherein the base metal ion comprises at least one of iron (Fe), copper (Cu), cobalt (Co), and nickel (Ni).

8. The method of claim 3 further comprising:
controlling the engine to operate fuel-rich to replenish $NH_3$-storages sites on the $NH_3$-SCR catalyst with $NH_3$; and
controlling the engine to operate fuel-lean when the $NH_3$-storages sites on the $NH_3$-SCR catalyst are saturated with $NH_3$.

9. The method of claim 1 wherein the engine is controlled to operate fuel-rich by supplying the engine with a mixture of air and gasoline fuel in which the AFR of the mixture is between about 14 to 14.2.

10. The method of claim 1 wherein the PGM catalyst comprises at least one of platinum (Pt), palladium (Pd), and rhodium (Rh).

11. The method of claim 1 wherein the CO-selective oxidation catalyst is located at a predetermined distance from the engine in the exhaust treatment system so that the temperature of the CO-selective oxidation catalyst typically falls within the range of about 200-400° C. during normal engine operation.

12. The method of claim 1 in which the PGM catalyst comprises Al2O3-supported particles of Pd and Rh, wherein the molar ratio of Pd to Rh is 6:1.

* * * * *